(12) United States Patent
Gou et al.

(10) Patent No.: US 8,543,082 B2
(45) Date of Patent: *Sep. 24, 2013

(54) METHOD AND SYSTEM FOR TRANSMITTING THE NOTIFICATION MESSAGE IN EARTHQUAKE AND TSUNAMI WARNING SYSTEM

(75) Inventors: Wei Gou, Shenzhen (CN); Feng Bi, Shenzhen (CN); Ming Yuan, Shenzhen (CN); Bin Wang, Shenzhen (CN); Xiaojiang Han, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 33 days.

This patent is subject to a terminal disclaimer.

(21) Appl. No.: 13/058,977

(22) PCT Filed: Jun. 30, 2009

(86) PCT No.: PCT/CN2009/072568
§ 371 (c)(1),
(2), (4) Date: Feb. 14, 2011

(87) PCT Pub. No.: WO2010/017727
PCT Pub. Date: Feb. 18, 2010

(65) Prior Publication Data
US 2011/0151828 A1    Jun. 23, 2011

(30) Foreign Application Priority Data
Aug. 13, 2008 (CN) .......................... 2008 1 0130803

(51) Int. Cl.
*H04M 11/04* (2006.01)
*H04W 72/00* (2009.01)
*H04B 7/00* (2006.01)
*H04L 12/28* (2006.01)
*H04H 20/71* (2008.01)

(52) U.S. Cl.
USPC ........ 455/404.1; 455/450; 455/515; 370/254; 370/310; 370/312

(58) Field of Classification Search
USPC ...... 455/404.1, 418, 458, 450, 515; 370/254, 370/312, 310
See application file for complete search history.

(56) References Cited

U.S. PATENT DOCUMENTS
2005/0037728 A1  2/2005  Binzel et al.
(Continued)

FOREIGN PATENT DOCUMENTS
CN    1894949 A    1/2007
(Continued)

OTHER PUBLICATIONS
International Search Report for PCT/CN2009/072568, Completed by the Chinese Patent Office on Sep. 26, 2009, 4 Pages.
(Continued)

*Primary Examiner* — Mahendra Patel
*Assistant Examiner* — Michael Mapa
(74) *Attorney, Agent, or Firm* — Brooks Kushman P.C.

(57) ABSTRACT

The present invention discloses a method and system for transmitting an ETWS primary notification message. After paging a terminal through a paging message containing ETWS message indication information, a base station schedules the ETWS primary notification message as user data in a sub-frame subsequent to a sub-frame with the paging message and generates control information containing an ETWS ID and resource information on a DL-SCH assigned for the primary notification message of the ETWS; the base station sends the control information over a PDCCH and sends the primary notification message of the ETWS over the DL-SCH based on the control information; and after receiving the paging message, the terminal detects and analyzes the control information containing the ETWS ID by monitoring the PDCCH to obtain the resource information thereof, and receives the ETWS primary notification message on corresponding resources of the DL-SCH based on the resource information.

17 Claims, 4 Drawing Sheets

(56) References Cited

U.S. PATENT DOCUMENTS

| | | |
|---|---|---|
| 2009/0055229 A1 | 2/2009 | Lidgren et al. |
| 2009/0088148 A1* | 4/2009 | Chung et al. ............... 455/423 |
| 2009/0239498 A1 | 9/2009 | Lee et al. |
| 2009/0253401 A1* | 10/2009 | Lee et al. ............... 455/404.1 |
| 2010/0035574 A1 | 2/2010 | Punz |
| 2010/0183031 A1* | 7/2010 | Dalsgaard et al. ............ 370/474 |

FOREIGN PATENT DOCUMENTS

| | | |
|---|---|---|
| CN | 101043733 | 9/2007 |
| CN | 101060713 | 10/2007 |
| JP | 2002344381 | 11/2002 |
| JP | 2006005843 | 1/2006 |
| JP | 2006135398 | 5/2006 |
| JP | 2007156766 | 6/2007 |
| WO | 2006107250 | 10/2006 |
| WO | 2007045564 A1 | 4/2007 |

OTHER PUBLICATIONS

Li "Study on Publica Warning System of Mobile Communication Network", CNKI Communications Technology Nov. 2008, vol. 41, No. 11, p. 211-213.

3GPP TR 23.828 V1.0.0. (Jun. 2008) 3rd Generation Partnership Project; Technical Specification Group Services and System Aspects; Earthquake and Tsunami Warning System Requirements and Solutions (ETWS); Solution Placeholder (Release 8), Jun. 2008, pp. 1-22.

3GPP TSG-RAN WG2 #62, ETWS Support in Release 8, Kansas City, US, May 5-9, 2008, pp. 1-3.

3GPP TS 36.211 V8.3.0 (May 2008) Technical Specification—3rd Generation Partnership Project; Technical Specification Group Radio Access Network; Evolved Universal Terrestrial Radio Access (E-UTRA); Physical Channels and Modulation (Realast 8), May 2008, pp. 1-77.

Search Report and Written Opinion for PCT/CN2009/072430, mailed Oct. 1, 2009.

* cited by examiner

METHOD AND SYSTEM FOR TRANSMITTING THE NOTIFICATION MESSAGE IN EARTHQUAKE AND TSUNAMI WARNING SYSTEM

CROSS-REFERENCE TO RELATED APPLICATION

This application is the U.S. national phase of PCT application. No. PCT/CN2009/072568 filed Jun. 30, 2009 which claims priority to Chinese application 200810130803.3 filed Aug. 13, 2008, the disclosures of which are incorporated in their entirety by reference herein.

TECHNICAL FIELD

The present invention relates to a technology for transmitting a notification message of an earthquake and tsunami warning system (ETWS), and more particularly, to a method and system for transmitting a notification message of an ETWS.

TECHNICAL BACKGROUND

In order to cope with positively natural disasters, such as earthquake and tsunami, it is necessary to establish an earthquake and tsunami warning system, i.e., an ETWS. When the natural disasters, such as earthquake and tsunami, occur, information regarding to the disasters may be sent to users timely through this system, thereby mitigating the influence of the natural disasters, such as earthquake and tsunami, on human.

FIG. 1 is a structure diagram of a network in which an operator of a public land mobile network (PLMN) provides earthquake and tsunami warning services for users through an ETWS. When disaster events will soon occur or after they occur, the government or other organs issue a warning notification to the operator of the PLMN, who sends a warning notification message to the masses of users through the ETWS included in the box in the figure.

According to differences of emergency degrees and purposes, the warning notification message may be divided into two types: the first type of notification message is known as a primary notification message which contains the most important disaster information (e.g., the earthquake or tsunami will soon occur) and is required to be transmitted to the users by the system in 4 s; the second type of notification message is known as a secondary notification message which contains auxiliary information regarding to the disasters (e.g., where assistance can be obtained) and is required to be transmitted to the users by the system in 10 s to 30 s. The primary notification message is composed of two portions: basic information and security information, where the basic information contains contents, such as warning type, warning area, etc., and has a length of 5 bytes; and the security information provides digital signature and time stamp for the basic information and has a length of about 50 bytes.

A system architecture of an ETWS in a LTE system proposed in the prior art is as shown in FIG. 2. The ETWS is implemented using a cell broadcast center (CBC), and the network architecture and interfaces of the ETWS are as shown in FIG. 2. The ETWS is comprised of an evolved universal terrestrial radio access network (E-UTRAN), a mobility management entity (MME), a serving gateway (S-GW), a packet data network gateway (P-GW), a home subscriber server (HSS), a policy and charging rule function (PCRF) entity and other supporting nodes. Based on the network architecture, when a base station in the E-UTRAN, which also called as an evolved node B, i.e., eNB, sends the primary notification message of the ETWS to a terminal, also called as user equipment (UE), via an air interface Uu, if a way of paging the UE first and then sending the primary notification message of the ETWS to the terminal through a system message in the next system message modification period (which typically will exceed 5 s) is applied, the time delay requirement of 4 s for the primary notification message will not be satisfied.

SUMMARY OF THE INVENTION

A technical problem to be solved by the present invention is to provide a method and system for transmitting a primary notification message of an earthquake and tsunami warning system so as to satisfy the requirement of the primary notification message of an earthquake and tsunami warning system for transmitting time.

In order to solve the technology problem described above, the present invention provides a method for transmitting a primary notification message of an earthquake and tsunami warning system comprising:

after paging a terminal through a paging message containing indication information of an earthquake and tsunami warning system (ETWS) message, a base station scheduling the primary notification message of the ETWS as user data in a sub-frame subsequent to a sub-frame with the paging message and generating control information containing an identifier (ID) of the ETWS, wherein the control information contains resource information on a downlink shared channel (DL-SCH) that is assigned for the primary notification message of the ETWS;

the base station sending the control information over a physical downlink control channel (PDCCH) and sending the primary notification message of the ETWS over the DL-SCH based on the control information; and after receiving the paging message containing the indication information of the ETWS message, the terminal detecting and analyzing the control information containing the identifier (ID) of the ETWS by monitoring the PDCCH to obtain the resource information of the control information, and receiving the primary notification message of the ETWS on corresponding resources of the DL-SCH based on the resource information.

Furthermore, the ID of the ETWS, which is pre-appointed by the base station and the terminal, is used by user terminals of the ETWS to obtain the control information of the primary notification message of the ETWS on the PDCCH; or the ID of the ETWS is an idle user identifier which is assigned temporarily for the user terminals of the ETWS before the base station sends the paging message, wherein the paging message further contains the ID of the ETWS; and the terminal reads the ID of the ETWS in the paging message after receiving the paging message.

Preferably, the ID of the ETWS is a radio network temporary identifier (RNTI) or an identifier other than the RNTI which can be identified by both the base station and the terminal and is used to identify the control information of the primary notification message of the ETWS.

Furthermore, the indication information of the ETWS message is implemented by configuring a flag, which is used for indicating that the primary notification message of the ETWS will be sent soon, in the paging message; or the indication information of the ETWS message is a pre-appointed international mobile subscriber identification number (IMSI) used for indicating that the primary notification message of the ETWS will be sent.

Furthermore, the base station determining whether to be able to send the whole primary notification messages of the ETWS in the first sub-frame subsequent to the sub-frame with the paging message whenever sending out the paging message;

if yes, the base station scheduling the primary notification message of the ETWS in the first sub-frame, generating the control information containing the ID of the ETWS, sending the control information over the PDCCH of the first sub-frame and sending the primary notification message of the ETWS over the DL-SCH of the first sub-frame based on the control information;

otherwise, the base station segmenting the primary notification message of the ETWS into a plurality of segments, sending each obtained segment in a plurality of sub-frames, respectively, scheduling one segment of all the segments obtained by segmenting the primary notification message of the ETWS in each sub-frame of the plurality of sub-frames, generating control information corresponding to the segment, the control information containing the ID of the ETWS and containing resource information on the DL-SCH assigned for the segment, sending the control information corresponding to the segment over the PDCCH of the sub-frame, and sending the segment of the primary notification message of the ETWS over the DL-SCH of the sub-frame based on the control information.

Preferably, when paging the terminal, the base station sends the paging message containing the indication information of the ETWS message in a plurality of sub-frames of one radio frame, schedules the primary notification message of the ETWS in one sub-frame of the radio frame, generates the control information, sends the control information over the PDCCH of the sub-frame, and sends the primary notification message of the ETWS over the DL-SCH of the sub-frame based on the control information.

Preferably, when being scheduled, the primary notification message of the ETWS is scheduled as user data with the highest priority.

Preferably, the base station sends the control information over the PDCCH by putting the control information in a common search space of the PDCCH of the sub-frame carrying the primary notification message of the ETWS or putting fixedly the control information in one or more control units of the PDCCH.

Furthermore, a sub-frame subsequent to the sub-frame with the paging message is an appropriate sub-frame subsequent to the paging message in a determined time period.

The present invention further provides a method for transmitting a notification message of an earthquake and tsunami warning system comprising:

after paging a terminal through a paging message containing indication information of an earthquake and tsunami warning system (ETWS) message, a base station scheduling the notification message of the ETWS as user data in a sub-frame subsequent to a sub-frame with the paging message and generating control information containing an identifier (ID) of the ETWS, and the control information containing resource information on a downlink shared channel (DL-SCH) that is assigned for the notification message of the ETWS;

the base station sending the control information over a physical downlink control channel (PDCCH) and sending the notification message of the ETWS over the DL-SCH based on the control information; and after receiving the paging message containing the indication information of the ETWS message, the terminal detecting and analyzing the control information containing the ID of the ETWS by monitoring the PDCCH to obtain the resource information thereof, and receiving the notification message of the ETWS on corresponding resources of the DL-SCH based on the resource information.

Furthermore, the notification message of the ETWS is a primary notification message of the ETWS or a secondary notification message of the ETWS.

The present invention further provides a method for transmitting a primary notification message of an earthquake and tsunami warning system comprising:

a base station paging a terminal through a paging message containing indication information of the earthquake and tsunami warning system (ETWS) message and containing basic information of the primary notification message of the ETWS into the paging message, scheduling security information of the primary notification message of the ETWS as user data and generating control information containing an identifier (ID) of the ETWS, the control information containing resource information on a downlink shared channel (DL-SCH) that is assigned for the security information;

the base station sending the control information over a physical downlink control channel (PDCCH) and sending the security information of the primary notification message of the ETWS over the DL-SCH based on the control information; and after receiving the paging message containing the indication information of the ETWS message, the terminal reading the basic information of the primary notification message of the ETWS in the paging message, detecting and then analyzing the control information containing the ID of the ETWS by monitoring the PDCCH to obtain the resource information thereof, and receiving the security information of the primary notification message of the ETWS on corresponding resources of the DL-SCH.

Furthermore, the ID of the ETWS, which is pre-appointed by the base station and the terminal, is a user identifier which is reserved and assigned for users of the ETWS, i.e., all users accessing a network; or the ID of the ETWS is an idle user identifier which is assigned temporarily for the users of the ETWS before the base station sends the paging message, the paging message further contains the ID of the ETWS; and the terminal reads the ID of the ETWS thereof after receiving the paging message.

Preferably, the ID of the ETWS is a radio network temporary identifier (RNTI) or an identifier other than the RNTI which can be identified by both the base station and the terminal and is used to identify the control information of the primary notification message of the ETWS.

Furthermore, the indication information of the ETWS message is implemented by configuring a flag, which is used for indicating that the primary notification message of the ETWS will be sent soon, in the paging message; or the indication information of the ETWS message is a pre-appointed international mobile subscriber identification number (IMSI) used for indicating that the primary notification message of the ETWS will be sent.

Furthermore, the base station determines whether to be able to send all of security information of the primary notification messages of the ETWS in the first sub-frame subsequent to the sub-frame with the paging message whenever sending out the paging message:

if yes, the base station schedules the security information of the primary notification message of the ETWS in the first sub-frame, generates the control information, sends the control information over the PDCCH of the first sub-frame and sends the security information of the primary notification message of the ETWS over the DL-SCH of the first sub-frame based on the control information;

otherwise, the base station segments the security information of the primary notification message of the ETWS into a plurality of segments, sends each obtained segment in a plurality of sub-frames, respectively, schedules one segment of the security information of the primary notification message of the ETWS in each sub-frame of the plurality of sub-frames, generates control information corresponding to the segment, the control information containing the ID of the ETWS and containing resource information on the DL-SCH assigned for the segment, sends the control information corresponding to the segment over the PDCCH of the sub-frame, and sends the segment of the security information of the primary notification message of the ETWS over the DL-SCH of the sub-frame based on the control information.

Preferably, when paging the terminal, the base station sends the paging message containing the indication information of the ETWS message in a plurality of sub-frames of one radio frame, schedules the security information of the primary notification message of the ETWS in one sub-frame of the radio frame, generates the control information, sends the control information over the PDCCH of the sub-frame, and sends the security information of the primary notification message of the ETWS over the DL-SCH of the sub-frame based on the control information.

Preferably, when being scheduled, the security information of the primary notification message of the ETWS is scheduled as user data with the highest priority, and the generated control information is put in a common search space of the PDCCH of the sub-frame or is put fixedly in one or more control units of the PDCCH for transmission.

The present invention further provides a system for transmitting a primary notification message of an earthquake and tsunami warning system (ETWS) comprising a base station and a terminal, wherein:

the base station comprises a first transmitting unit, a scheduling unit and a second transmitting unit, wherein:

the first transmitting unit is configured to page the terminal through a paging message at a paging opportunity of the terminal and trigger the scheduling unit, the paging message containing ETWS message indication information;

the scheduling unit is configured to schedule the primary notification message of the ETWS as user data in a sub-frame subsequent to a sub-frame with the paging message containing the indication information of the ETWS message after being triggered, generate control information containing an ID of the ETWS and trigger the second transmitting unit, the control information containing resource information on a downlink shared channel (DL-SCH) that is assigned for the primary notification message of the ETWS;

the second transmitting unit is configured to send the control information over a physical downlink control channel (PDCCH) and send the primary notification message of the ETWS over the DL-SCH based on the control information after being triggered;

the terminal comprises a first receiving unit, a second receiving unit and a third receiving unit, wherein:

the first receiving unit is configured to trigger the second receiving unit after receiving the paging message containing the ETWS message indication information;

the second receiving unit is configured to detect and analyze the control information containing the ID of the ETWS by monitoring the PDCCH after being triggered, to obtain the resource information contained therein and trigger the third receiving unit; and the third receiving unit is configured to receive the primary notification message of the ETWS on corresponding resources of the DL-SCH based on the resource information after being triggered.

Furthermore, the base station and the terminal pre-appoint the ID of the ETWS, which is used by user terminals of the ETWS to obtain the control information of the primary notification message of the ETWS on the PDCCH; or the first transmitting unit in the base station assigns temporarily an idle user identifier as the ID of the ETWS for users of the ETWS before sending the paging message containing the ID of the ETWS; and the first receiving unit of the terminal reads the ID of the ETWS thereof for use by the second receiving unit after receiving the paging message.

Preferably, the ID of the ETWS is a radio network temporary identifier (RNTI) or an identifier other than the RNTI which can be identified by both the base station and the terminal and is used to identify the control information of the primary notification message of the ETWS.

Furthermore, the indication information of the ETWS message is implemented by configuring a flag, which used for indicating that the primary notification message of the ETWS will be sent soon, in the paging message; or the indication information of the ETWS message is a pre-appointed international mobile subscriber identification number (IMSI) used for indicating that the primary notification message of the ETWS will be sent.

Furthermore, the scheduling unit is further configured to determine whether to be able to send the whole primary notification message of the ETWS in the first sub-frame subsequent to the sub-frame with the paging message after being triggered:

if yes, the scheduling unit schedules the primary notification message of the ETWS in the first sub-frame, generates the control information containing the ID of the ETWS and triggers the second transmitting unit; the second transmitting unit sends the control information over the PDCCH of the first sub-frame and sends the primary notification message of the ETWS over the DL-SCH of the first sub-frame based on the control information;

otherwise, the scheduling unit segments the primary notification message of the ETWS into a plurality of segments, sends each obtained segment in a plurality of sub-frames, respectively, schedules one segment of all the segments obtained by segmenting the primary notification message of the ETWS in each sub-frame of the plurality of sub-frames, generates control information corresponding to the segment and triggers the second transmitting unit, the control information containing the ID of the ETWS and containing resource information on the DL-SCH assigned for the segment; and the second transmitting unit sends the control information corresponding to the segment over the PDCCH of the sub-frame and sends the segment of the primary notification message of the ETWS over the DL-SCH of the sub-frame based on the control information.

Preferably, when paging the terminal, the first transmitting unit of the base station sends the paging message containing the indication information of the ETWS message in a plurality of sub-frames of one radio frame; accordingly, the scheduling unit schedules the primary notification message of the ETWS in one sub-frame of the radio frame and generates the control information; and the second transmitting unit sends the control information over the PDCCH of the sub-frame and sends the primary notification message of the ETWS over the DL-SCH of the sub-frame based on the control information Preferably, the scheduling unit schedules the primary notification message of the ETWS as user data with the highest priority when scheduling the primary notification message of the ETWS.

Furthermore, the second transmitting unit sends the control information over the PDCCH by putting the control information in a common search space of the PDCCH of a sub-frame carrying the primary notification message of the ETWS or putting fixedly the control information in one or more control units of the PDCCH.

Preferably, the sub-frame subsequent to the sub-frame with the paging message is an appropriate sub-frame subsequent to the sub-frame with paging message in a determined time period.

The present invention further provides a system for transmitting a primary notification message of an earthquake and tsunami warning system (ETWS) comprising a base station and a terminal, wherein:

the base station further comprises a first transmitting unit, a scheduling unit and a second transmitting unit, wherein:

the first transmitting unit is configured to page the terminal at a paging opportunity of the terminal and trigger the scheduling unit, the paging message containing ETWS message indication information and basic information of the primary notification message of the ETWS;

the scheduling unit is configured to schedule security information of the primary notification message of the ETWS as user data in a sub-frame subsequent to a sub-frame with the paging message after being triggered, generate control information containing an ID of the ETWS and trigger the second transmitting unit, the control information containing resource information on a downlink shared channel (DL-SCH) that is assigned for the security information of the primary notification message of the ETWS;

the second transmitting unit is configured to send the control information over a physical downlink control channel (PDCCH) and send the security information of the primary notification message of the ETWS on the assigned resources of the DL-SCH based on the control information after being triggered;

the terminal comprises a first receiving unit, a second receiving unit and a third receiving unit, wherein:

the first receiving unit is configured to, after receiving the paging message containing the indication information of the ETWS message, read the basic information of the primary notification message of the ETWS contained therein and trigger the second receiving unit;

the second receiving unit is configured to receive and analyze the control information identified by the ID of the ETWS after detecting the ID of the ETWS by monitoring the PDCCH after being triggered, to obtain the resource information thereof and trigger the third receiving unit; and the third receiving unit is configured to receive the security information of the primary notification message of the ETWS on corresponding resources of the DL-SCH based on the resource information after being triggered.

Preferably, the base station and the terminal pre-appoint the ID of the ETWS; or the first transmitting unit in the base station assigns temporarily an idle user identifier as the ID the ETWS for users of the ETWS before sending the paging message; and the first receiving unit of the terminal reads the ID of the ETWS thereof for use by the second receiving unit after receiving the paging message.

Preferably, the ID of the ETWS is a radio network temporary identifier (RNTI) or an identifier other than the RNTI which can be identified by both the base station and the terminal and is used to identify the control information of the primary notification message of the ETWS.

Furthermore, the indication information of the ETWS message is implemented by configuring a flag, which is used for indicating that the primary notification message of the ETWS will be sent soon, in the paging message; or the indication information of the ETWS message is a pre-appointed international mobile subscriber identification number (IMSI) used for indicating that the primary notification message of the ETWS will be sent.

Preferably, the scheduling unit is further configured to determine whether to be able to send the whole security information of the primary notification messages of the ETWS in the first sub-frame subsequent to the sub-frame with the paging message after being triggered:

if yes, the scheduling unit schedules the security information of the primary notification message of the ETWS in the first sub-frame, generates the control information and triggers the second transmitting unit; the second transmitting unit sends the control information over the PDCCH of the first sub-frame and sends the security information of the primary notification message of the ETWS over the DL-SCH of the first sub-frame based on the control information;

otherwise, the scheduling unit segments the security information of the primary notification message of the ETWS into a plurality of segments, sends each obtained segment in a plurality of sub-frames respectively, schedules one segment of all the segments obtained by segmenting the security information of the primary notification message of the ETWS in each sub-frame of the plurality of sub-frames, generates control information corresponding to the segment and triggers the second transmitting unit, the control information containing the ID of the ETWS and containing resource information on the DL-SCH assigned for the segment; and the second transmitting unit sends the control information corresponding to the segment over the PDCCH of the sub-frame and sends the segment of the security information of the primary notification message of the ETWS over the DL-SCH of the sub-frame based on the control information.

Preferably, when paging the terminal, the first transmitting unit of the base station sends the paging message containing the indication information of the ETWS message on the plurality of sub-frames of one radio frame; accordingly, the scheduling unit schedules the security information of the primary notification message of the ETWS in one sub-frame of the radio frame and generates the control information; and the second transmitting unit sends the control information over the PDCCH of the sub-frame and sends the security information of the primary notification message of the ETWS over the DL-SCH of the sub-frame based on the control information.

Furthermore, the scheduling unit schedules the security information of the primary notification message of the ETWS as user data with the highest priority when scheduling the security information of the primary notification message of the ETWS; and the second transmitting unit puts the generated control information in a common search space of the PDCCH of the sub-frame or puts fixedly the generated control information in one or more control units of the PDCCH for transmission.

The transmission of the primary notification message of the ETWS may be implemented by the technical scheme provided in the present invention to satisfy the time delay requirement of 4 s. The existing paging message structure is modified less and there is no or very little increased overhead.

PREFERRED EMBODIMENTS OF THE INVENTION

Specific embodiments of the present invention will be further described in detail below in conjunction with the accompanying drawings.

First, the present invention will be described by taking an application in a LTE system as an example, where a notification message of an ETWS is a primary notification message of the ETWS.

If both basic information and security information of the primary notification message of the ETWS are contained directly in the paging message in order to meet the time delay requirement of the primary notification message of the ETWS, the primary notification message is required to be segmented and the existing paging message structure is required to be modified because content of the primary notification message is pretty large, thus, much modification will be made on the system and the operation will be cumbersome. According to the present invention, however, the primary notification message of the ETWS or security information thereof is sent to a terminal via a downlink shared channel (DL-SCH), and in conjunction with a corresponding scheduling mode, modifications for the message are reduced while satisfying the time delay requirement.

It should be noted that resource information in the description generally refers to time-frequency resource information in the DL-SCH.

The First Embodiment

Figure 1:
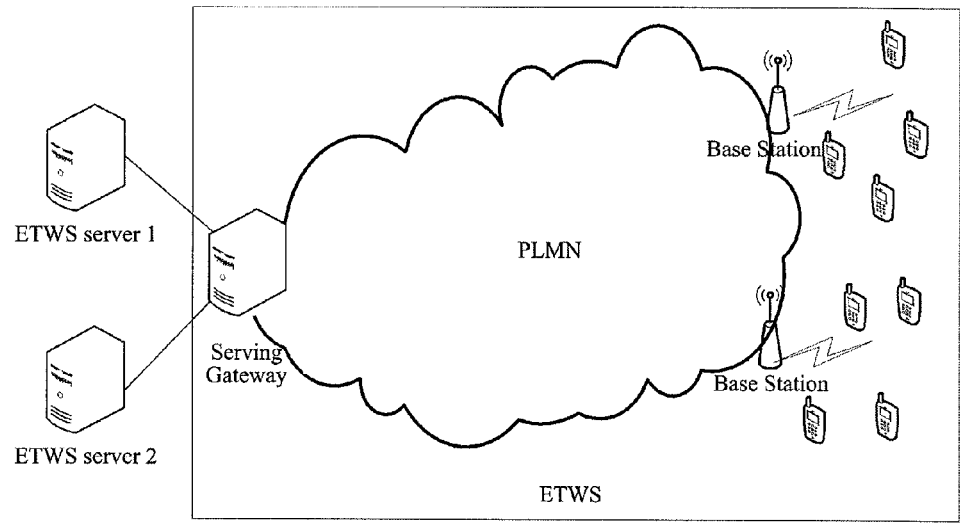
FIG. 1 is a system architecture diagram of an ETWS.
Figure 2:
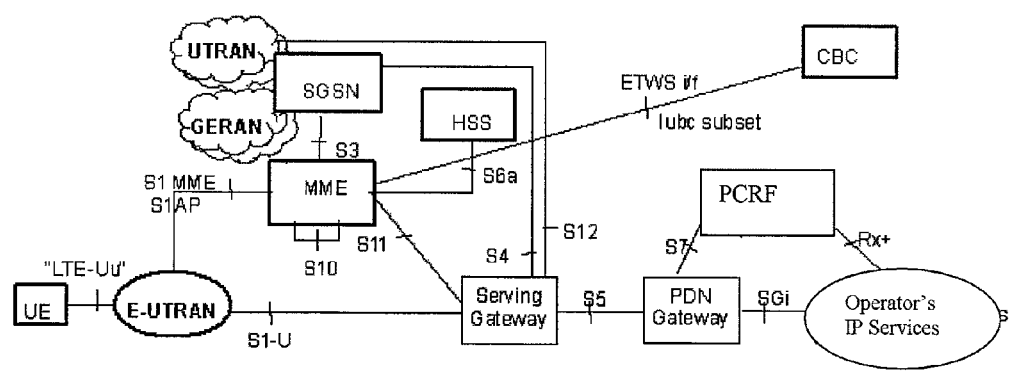
FIG. 2 is a schematic diagram of network architecture and interfaces of an ETWS in a LTE system.
Figure 3A:
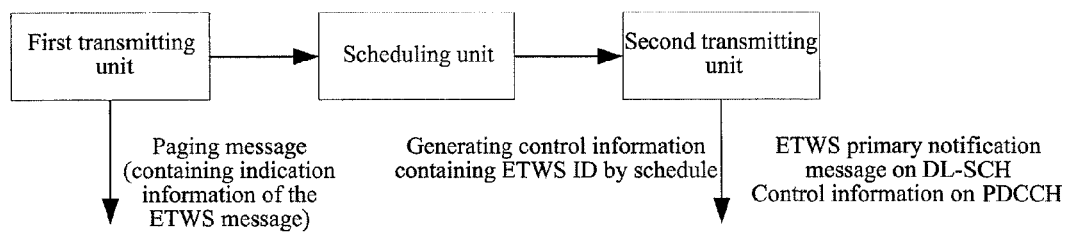
FIGS. 3A and 3B are diagrams of a base station and a terminal's functional units associated with transmission of a primary notification message of an ETWS in accordance with the first embodiment of the present invention, respectively.
Figure 3B:
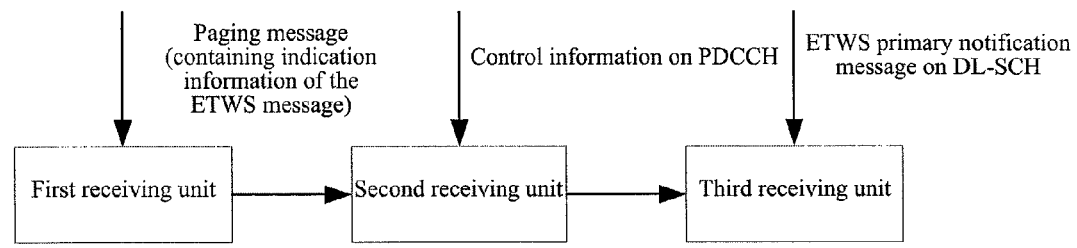

In this embodiment, both basic information and security information of a primary notification message of an ETWS are scheduled and sent over a DL-SCH. A base station and a terminal's functional units associated with transmission of the primary notification message of the ETWS are shown in FIGS. 3A and 3B.

The base station comprises a first transmitting unit, a scheduling unit and a second transmitting unit.

The first transmitting unit is configured to page the terminal through a paging message containing ETWS message indication information at a paging opportunity of the terminal and trigger the scheduling unit.

The scheduling unit is configured to schedule the primary notification message of the ETWS as user data in a sub-frame subsequent to a sub-frame with the paging message after being triggered, generate control information containing a pre-appointed ID of the ETWS and trigger the second transmitting unit, wherein the control information contains resource information on the DL-SCH that is assigned for the primary notification message of the ETWS. The specific scheduling mode of the scheduling unit will be described in detail in a process of a method in accordance with this embodiment.

Here and in the following description, the ID of the ETWS may be a pre-appointed or temporarily-assigned radio network temporary identifier (RNTI) or an identifier other than the RNTI which can be identified by both the base station and the terminal and is used to identify the control information of the primary notification message of the ETWS. When the ID of the ETWS is the RNTI, the RNTI is contained in the control information of the primary notification of the ETWS by scrambling cyclic redundancy check (CRC) bits in the control information using the RNTI (referring to the description of Section 5.3.3.2 in the protocol 36.212_870 for detail). However, this is only an example, the base station and terminal may assign the ID of the ETWS without CRC information temporarily, as long as the terminal can identify this identifier and analyze corresponding control information based on it.

The second transmitting unit is configured to send the control information over a physical downlink control channel (PDCCH) and send the primary notification message of the ETWS over the assigned resources of the DL-SCH based on the control information after being triggered.

In this embodiment, sending the primary notification message of the ETWS as described herein means sending both the basic information and security information of the primary notification message of the ETWS.

The terminal comprises a first receiving unit, a second receiving unit and a third receiving unit.

The first receiving unit is configured to trigger the second receiving unit after receiving the paging message containing the indication information of the ETWS message.

The second receiving unit is configured to commence monitoring the PDCCH after being triggered, detect the control information containing the ID of the ETWS and then analyze the control information identified by the ID of the ETWS to obtain the resource information on the DL-SCH contained therein and assigned for the primary notification message of the ETWS and trigger the third receiving unit.

The third receiving unit is configured to receive the primary notification message of the ETWS on corresponding resources of the DL-SCH based on the resource information after being triggered.

The ID of the ETWS is a user identifier which is reserved by the base station for users of the ETWS. When the pre-appointed ID of the ETWS is used, each paging area or each base station reserves and assigns the same ID of the ETWS for the users of the ETWS. When knowing that there is the primary notification message of the ETWS to be sent, all user terminals of the ETWS are required to monitor and detect the control information containing the ID of the ETWS on the PDCCH and analyze the control information.

Figure 4:
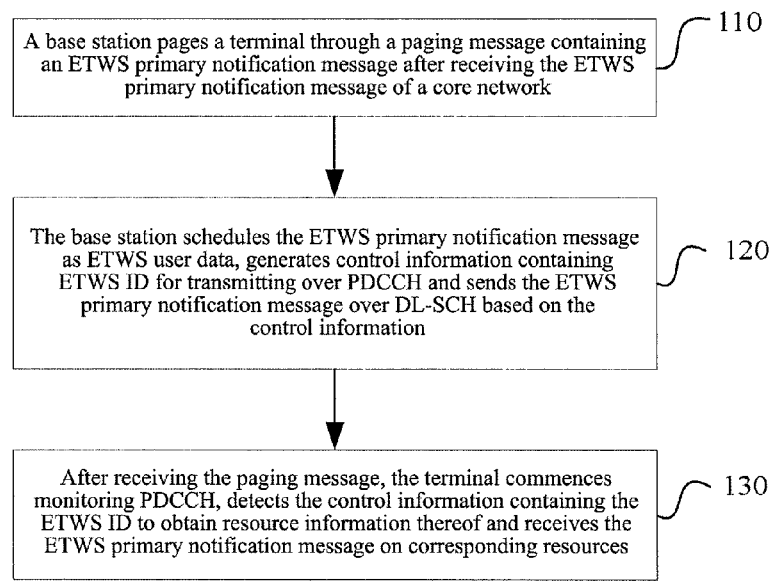
FIG. 4 is a flow chart of a method for transmitting the primary notification message of the ETWS in accordance with the first embodiment of the present invention.

The flow of the method in accordance with this embodiment is shown in FIG. 4. The method comprises the following steps.

Step 110: the base station pages the terminal through the paging message containing the indication information of the ETWS message at a paging opportunity of the terminal after receiving the primary notification message of the ETWS of a core network.

In this embodiment, a pre-appointed international mobile subscriber identification number (IMSI), i.e. ETWS IMSI, is used as the indication information of the ETWS message which is used by the base station to notify the terminal that the primary notification message of the ETWS will be sent soon.

However, the ETWS IMSI being used as the indication information of the ETWS message is not the only implementing method, and in other embodiments, the indication information of the ETWS message may be a flag set in the paging message, used for indicating that the primary notification message of the ETWS will be sent soon, for example, a flag bit set by 1 bit.

Step 120: the base station schedules the primary notification message of the ETWS as user data in a sub-frame subsequent to a sub-frame with the paging message, generates control information containing the pre-appointed ID of the ETWS, wherein the control information contains resource information on the DL-SCH that is assigned for the primary notification message of the ETWS, and then sends the control information over the PDCCH and sends the primary notification message of the ETWS over the DL-SCH based on the control information.

How the base station chooses a sub-frame for sending the primary notification message of the ETWS is described herein. In order to enable the terminal to receive the primary notification message of the ETWS in extremely short time after receiving the paging message containing the indication information of the ETWS message, the best method is that the base station schedules the primary notification message of the ETWS in the first sub-frame subsequent to the sub-frame with the paging message, generates the corresponding control information containing the ID of the ETWS, and sends the generated control information over the PDCCH of the first sub-frame and sends the primary notification message of the ETWS over the DL-SCH of the first sub-frame based on the control information.

However, there may not be sufficient resources in the first sub-frame subsequent to the sub-frame with the paging message for sending the whole primary notification message of the ETWS, in which condition, the base station also possibly sends the primary notification message of the ETWS and its resource information in other sub-frames subsequent to the sub-frame with the paging message, for example, the primary notification message of the ETWS and its resource information may be sent in the second or the third or the fourth sub-frames subsequent to the sub-frame with the paging message. As another example, the base station can choose one or more sub-frames in a determined time period to send the primary notification message of the ETWS. The interval from the start time of the determined time period to the time of the sub-frame with the paging message containing the indication information of the ETWS message should be shorter (e.g., from 0 millisecond to hundreds of milliseconds, generally a fixed value appointed by the terminal and base station is used) to ensure rapid transmission of the indication information of the ETWS message. The length of the determined time period is typically 10 milliseconds to 40 milliseconds (generally a fixed value appointed by the terminal and base station is used) to ensure that there is sub-frame resources, which can be used for carrying the primary notification message of the ETWS, in the time period. If the time period is too long, the time for the terminal to detect the control information containing the ID of the ETWS on the PDCCH in the sub-frame in the time period will be prolonged; if the time period is too short, it is possible that a sub-frame appropriate for sending the primary notification message of the ETWS cannot be found in the time period. In addition, if the whole primary notification message of the ETWS can not be sent in one sub-frame, the base station may also segment one primary notification message of the ETWS into a plurality of segments for transmission in a plurality of sub-frames. In each sub-frame, one segment of the plurality of segments obtained by segmenting the primary notification message of the ETWS is scheduled, control information containing the ID of the ETWS corresponding to the segment is generated, and the control information corresponding to the segment is sent over the PDCCH of the sub-frame and the segment of the primary notification message of the ETWS is sent over the DL-SCH of the sub-frame based on the control information. Therefore, when the base station segments the primary notification message of the ETWS into the plurality of segments for transmission in the plurality of sub-frames, the control information of the primary notification message of the ETWS is dispersed in each sub-frame, and the control information in each sub-frame contains the ID of the EDWS and the corresponding resource information assigned for each segment obtained by segmenting the primary notification message of the ETWS.

In this embodiment, when the base station schedules user data from the first sub-frame subsequent to the sub-frame with the paging message, it schedules the primary notification message of the ETWS as the user data with the highest priority, generates the control information containing the ID of the ETWS, and puts the control information in a common search space of the PDCCH or puts fixedly the control information in one or more control units of the PDCCH for transmission to facilitate rapid detection of the terminal.

The scheduling mode used in this embodiment may be applied to other embodiments of the present invention, except that in other embodiments, the scheduled object may be security information in the primary notification message of the ETWS. The scheduling mode will not be repeated any more in other embodiments.

Step 130: after receiving the paging message containing the indication information of the ETWS message, the terminal commences monitoring the PDCCH, analyzes the control information identified by the ID of the ETWS if the pre-appointed ID of the ETWS is detected, to obtain the resource information on the DL-SCH assigned for the primary notification message of the ETWS and contained in the control information and receive the primary notification message of the ETWS on corresponding resources of the DL-SCH.

The terminal can determine that the paging message containing the indication information of the ETWS message is received when determining that the IMSI in the received paging message is the ETWS IMSI.

If the base station sends the primary notification message of the ETWS in a certain time period, then the terminal only needs to commence monitoring the PDCCH in the time period. The other processing steps are the same as above and will not be repeated any more herein.

A Variation of the First Embodiment

In this variation, the ID of the ETWS is not pre-appointed but assigned temporarily.

Steps of a method corresponding to the variation are required to be modified as follows.

After receiving the primary notification message of the ETWS of the core network, the base station assigns temporarily an idle user identifier as the ID of the ETWS and contains both the indication information of the ETWS message and the ID of the ETWS in the paging message sent to the terminal.

The base station schedules the primary notification message of the ETWS as the user data of the ETWS in a sub-frame subsequent to the sub-frame with the paging message, generates the control information containing the temporarily-assigned ID of the ETWS, wherein the control information contains the resource information on the DL-SCH assigned for the primary notification message of the ETWS, and then sends the control information over the PDCCH and sends the primary notification message of the ETWS over the DL-SCH based on the control information.

After receiving the paging message containing the indication information of the ETWS message, the terminal obtains first the ID of the ETWS, then monitors the PDCCH, and analyzes the control information identified by the ID of the ETWS after detecting the control information containing the ID of the ETWS, and after obtaining the resource information on the DL-SCH assigned for the primary notification message of the ETWS and contained in the control information, and the terminal receives the primary notification message of the ETWS on the corresponding resources of the DL-SCH.

A system corresponding to the variation:

At the base station side, after receiving the primary notification message of the ETWS of the core network, the first transmitting unit needs to assign temporarily an idle user identifier as the ID of the ETWS, and contains simultaneously the ID of the ETWS in the paging message containing the indication information of the ETWS message. Except that the ID of the ETWS used is assigned temporarily, the functions of the scheduling unit and the second transmitting unit are the same as those in the first embodiment and will not be repeated any more herein.

At the terminal side, after receiving the paging information containing the indication information of the ETWS message, the first receiving unit obtains first the ID of the ETWS and then triggers the second receiving unit. Except that the ID of the ETWS used is assigned temporarily, the functions of the second and third receiving units are the same as those in the first embodiment and will not be repeated any more herein.

The Second Embodiment

In this embodiment, only basic information of a primary notification message of an ETWS is contained in a paging message sent by a base station to a terminal, and only security information of the primary notification message of the ETWS is sent over a DL-SCH.

Figure 5A:
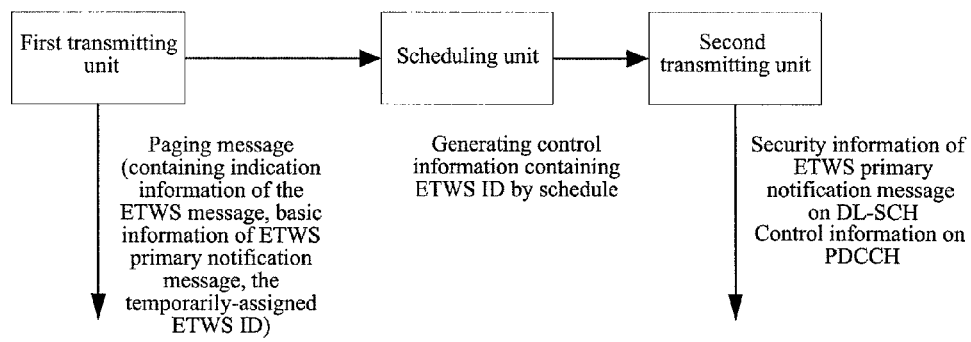
FIGS. 5A and 5B are diagrams of a base station and a terminal's functional units associated with transmission of a primary notification message of an ETWS in accordance with the second embodiment of the present invention, respectively.
Figure 5B:
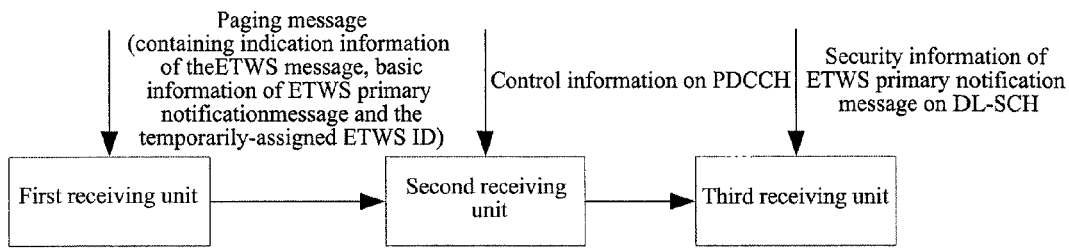

In this embodiment, the base station and the terminal's functional units associated with transmission of the primary notification message of the ETWS are shown in FIG. 5A and FIG. 5B.

The base station comprises a first transmitting unit, a scheduling unit and a second transmitting unit, wherein, The first transmitting unit is configured to assign temporarily an idle RNTI as an ID of the ETWS, which is referred as ETWS RNTI hereinafter for the sake of ease of description, page the terminal through a paging message at a paging opportunity of the terminal and trigger the scheduling unit, wherein the paging message contains ETWS message indication information, the basic information of the primary notification message of the ETWS and the temporarily-assigned ETWS RNTI.

The scheduling unit is configured to schedule the security information of the primary notification message of the ETWS as user data in a sub-frame subsequent to a sub-frame with the paging message after being triggered, generate control information containing the temporarily-assigned ETWS RNTI and trigger the second transmitting unit, wherein the control information also contains resource information on the DL-SCH that is assigned for the security information of the primary notification message of the ETWS on the DL-SCH. The specific scheduling mode of the scheduling unit is described in detail in the process of the method in accordance with the first embodiment, and in the second embodiment, only the primary notification message of the ETWS in the first embodiment is required to be replaced with the security information of the primary notification message of the ETWS, and the specific scheduling mode will not be repeated any more herein.

The second transmitting unit is configured to send the control information over a PDCCH and send the security information of the primary notification message of the ETWS on the assigned DL-SCH resources based on the control information after being triggered.

The terminal comprises a first receiving unit, a second receiving unit and a third receiving unit, wherein, The first receiving unit is configured to, after receiving the paging message containing the indication information of the ETWS message, read the basic information of the primary notification message of the ETMS contained therein and the temporarily-assigned ETWS RNTI and trigger the second receiving unit.

The second receiving unit is configured to commence monitoring the PDCCH, detect and then analyze the control information containing the ETWS RNTI after being triggered, to obtain the resource information on the DL-SCH assigned for the security information of the primary notification message of the ETWS which is contained in the control information and trigger the third receiving unit.

The third receiving unit is configured to receive the security information of the primary notification message of the ETWS on corresponding resources of the DL-SCH based on the resource information on the DL-SCH which is assigned for the security information of the primary notification message of the ETWS after being triggered.

The temporarily-assigned ETWS RNTI is a user identifier used when the user data is sent in a LET system. The RNTI is contained in the control information of the primary notification of the ETWS by scrambling cyclic redundancy check (CRC) bits in the control information using the RNTI. However, this is only an example, the base station and terminal may assign the ID of the ETWS without CRC information temporarily, as long as the terminal can identify this identifier and analyze the corresponding control information based on it.

Figure 6:
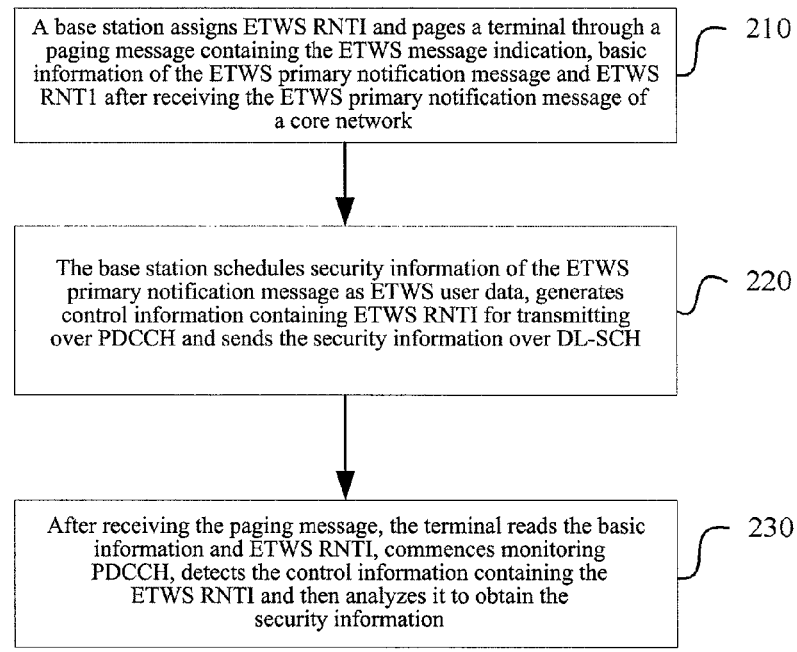
FIG. 6 is a flow chart of a method for transmitting the primary notification message of the ETWS in accordance with the second embodiment of the present invention

The process of the method for transmitting the primary notification message of the ETWS in accordance with this embodiment is shown in FIG. 6. The method comprises the following steps.

Step 210: the base station assigns temporarily an idle RNTI as the ETWS RNTI and pages the terminal through the paging message at a paging opportunity of the terminal after receiving the primary notification message of the ETWS of a core network, wherein the paging message contains the indication information of the ETWS message, the basic information of the primary notification message of the ETWS and the temporarily-assigned ETWS RNTI.

In this embodiment, the ETWS IMSI is used as the indication information of the ETWS message as well, and the basic information of the primary notification message of the ETWS may be put in an information unit of the paging message for the terminal to read. Each paging area or each base station may assign a different RNTI.

Step 220: the base station schedules the security information of the primary notification message of the ETWS as the user data in a sub-frame subsequent to a sub-frame with the paging message, generates control information containing the temporarily-assigned ETWS RNTI, wherein the control information contains resource information on the downlink shared channel (DL-SCH) that is assigned for the security information, and then sends the control information over the PDCCH and sends the security information of the primary notification message of the ETWS over the DL-SCH based on the control information.

The choosing of sub-frames in which the security information of the primary notification message of the ETWS and its control information are sent is the same as that in the first embodiment and will not be repeated any more herein.

Step 230: after receiving the paging information containing the indication information of the ETWS message, the terminal reads the basic information of the primary notification message of the ETWS contained therein and the temporarily-assigned ETWS RNTI, commences monitoring the PDCCH, analyzes the control information identified by the ETWS RNTI if the ETWS RNTI is detected, to obtain the resource information on the DL-SCH assigned for the security information of the primary notification message of the ETWS which is contained in the control information and receive the security information of the primary notification message of the ETWS on corresponding resources of the DL-SCH.

A Variation of the Second Embodiment

In this variation, the ID of the ETWS is not assigned temporarily but pre-appointed.

Steps of a method corresponding to the variation are required to be modified as follows.

After receiving the primary notification message of the ETWS of the core network, the base station pages the terminal through the paging message containing the indication information of the ETWS message and the basic information of the primary notification message of the ETWS at a paging opportunity of the terminal.

The base station schedules the security information of the primary notification message as the user data in a sub-frame subsequent to the sub-frame with the paging message and generates the control information containing the pre-appointed ID of the ETWS, wherein the control information contains the resource information on the DL-SCH which is assigned for the security information, and then the base station sends the control information over the PDCCH and sends the security information of the primary notification message of the ETWS over the DL-SCH based on the control information.

After receiving the paging message containing the indication information of the ETWS message, the terminal reads the basic information of the primary notification message of the ETWS contained therein, commences monitoring the PDCCH at the same time, and analyzes the control information identified by the pre-appointed ID of the ETWS if detecting the pre-appointed ID of the ETWS, to obtain the resource information on the DL-SCH assigned for the security information of the primary notification message of the ETWS which is contained in the control information and receive the security information of the primary notification message of the ETWS on the corresponding resources.

A System Corresponding to the Variation:

At the base station side, after receiving the primary notification message of the ETWS of the core network, the first transmitting unit contains simultaneously the basic information of the primary notification message of the ETWS in the paging message containing the indication information of the ETWS message. Except that the ID of the ETWS used is pre-appointed, the functions of the scheduling unit and the second transmitting unit are the same as those in the second embodiment and will not be repeated any more herein.

At the terminal side, after receiving the paging message containing the indication information of the ETWS message, the first receiving unit reads the basic information of the primary notification message of the ETWS contained therein and triggers the second receiving unit. The second receiving unit is configured to commence monitoring the PDCCH after triggered, receive and analyze the control information identified by the pre-appointed ID of the ETWS after detecting the pre-appointed ID of the ETWS to obtain the resource information thereof and trigger the third receiving unit. The functions of the third receiving units are the same as those in the second embodiment and will not be repeated any more herein.

The Third Embodiment

In still another embodiment in accordance with the present invention, after receiving a primary notification message of an ETWS of a core network, a base station may send a paging message containing ETWS message indication information to a terminal in a plurality of sub-frames of a radio frame, e.g., in three or four sub-frames of a radio frame. In order to prevent the transmission of the primary notification message of the ETWS from being too frequent, the base station schedules the primary notification message of the ETWS or security information thereof as user data only in a certain sub-frame in the radio frame (the sub-frame may be pre-appointed) and generates control information containing the ID of the ETWS, wherein the control information contains resource information on the DL-SCH which is assigned for the primary notification message of the ETWS or the security information of the primary notification message of the ETWS. Subsequently, the control information containing the ID of the ETWS is sent over the PDCCH and the primary notification message of the ETWS or the security information thereof is sent over the DL-SCH based on the control information. The ID of the ETWS may be pre-appointed or assigned temporarily. When only the security information is sent over the DL-SCH, the basic information is sent by being contained in the paging message.

The processing at the terminal side is the same as that in the first embodiment, that is, after receiving the paging message carrying the indication information of the ETWS message, the terminal commences monitoring PDCCH, and after detecting the ID of the ETWS, the terminal receives and analyzes the control information identified by the ID of the ETWS to acquire the resources information thereof, and receives the primary notification message of the ETWS on the corresponding resources of DL-SCH.

Two application examples in accordance with the present invention will be described below.

The First Application Example

In this example, security information of a primary notification message of an ETWS is scheduled via a PDCCH and carried on a DL-SCH, assuming that the security information of the primary notification message of the ETWS is scheduled and carried in the next sub-frame subsequent to a sub-frame with a paging message containing ETWS message indication information, the next sub-frame is able to carry the security information of the primary notification message of the ETWS.

After receiving the primary notification message of the ETWS of a core network, the base station initiates paging to a terminal through the paging message at a paging opportunity of the terminal, an IMSI in the paging message is an ETWS IMSI and the paging message contains basic information of the primary notification message of the ETWS. The base station schedules the security information of the primary notification message of the ETWS as user data in the next sub-frame subsequent to the sub-frame with the paging message and generates control information containing the ID of the ETWS, wherein the control information contains resource information on the DL-SCH assigned for the security information. The base station sends the control information in the next sub-frame subsequent to the sub-frame with the paging message and sends the security information of the primary notification message of the ETWS to the terminal on corresponding resources of the DL-SCH based on the control information. In this example, the ID of the ETWS is a pre-appointed public user identifier.

The terminal receives the paging message at its paging opportunity, determines that the paging is ETWS paging when the IMSI of the received paging message is the ETWS IMSI, and reads the basic information of the primary notification message of the ETWS contained in the paging message. The terminal monitors the PDCCH of the next sub-frame, detects the control information identified by the ID of the ETWS thereof, analyzes resource information thereof and receives the security information of the primary notification message of the ETWS on the corresponding resources of the DL-SCH.

The Second Application Example

In this example, a primary notification message of an ETWS is scheduled via a PDCCH and carried on a DL-SCH, assuming that basic information of the primary notification message of the ETWS and its security information are scheduled and carried in the next sub-frame subsequent to a sub-frame with a paging message containing ETWS message indication information, the next sub-frame is able to carry the primary notification message of the ETWS.

After receiving the primary notification message of the ETWS of a core network, the base station initiates paging to a terminal through the paging message at a paging opportunity of the terminal, an IMSI in the paging message is an ETWS IMSI and the paging message contains information of the ID of the ETWS, which is an idle user identifier specified temporarily by the base station. The base station schedules the primary notification message of the ETWS as user data in the next sub-frame subsequent to the sub-frame with the paging message and generates control information containing the ID of the ETWS, wherein the control information contains resource information on the DL-SCH assigned for the primary notification message of the ETWS. The base station sends the control information in the next sub-frame subsequent to the sub-frame with the paging message and sends the primary notification message of the ETWS to the terminal on corresponding resources of the DL-SCH based on the control information.

The terminal receives the paging message at its paging opportunity, determines that the paging is ETWS paging when the IMSI of the received paging message is the ETWS IMSI, and reads information of the ID of the ETWS contained in the paging message. The terminal monitors control information regarding to the ID of the ETWS on the PDCCH of the next sub-frame, analyzes resource information thereof and receives the primary notification message of the ETWS over the DL-SCH based on the resource information.

In a word, using the present invention, without considering the case where the terminal has not received the paging message sent by the base station due to problems, such as air interface quality, the maximum time delay for paging the terminal is 2.56 s. In the present invention, after the terminal receives the paging message, it commences monitoring immediately the control information identified by the ID of the ETWS on the PDCCH, analyzes out the resource information and reads the primary notification message of the ETWS based on the resource information. The time delay may be specified to be within 2 ms, thus generally, the time for the primary notification message of the ETWS to reach the terminal will not exceed 4 s.

The method for transmitting the primary notification message of the ETWS in accordance with the present invention may be applied to an ETWS in other communication system as well, which will not be repeated any more herein.

The method for transmitting the primary notification message of the ETWS in accordance with the present invention may be used for transmitting directly other message data, such as a secondary notification message of the ETWS. When the method for transmitting the primary notification message of the ETWS in the first embodiment is used for transmitting the secondary notification message, the primary notification message of the ETWS is required to be replaced with the secondary notification message of the ETWS, and the ID of the ETWS and the indication information of the ETWS message etc. are replaced with the control information identifier of the secondary notification message of the ETWS and indication information of the secondary notification message of the ETWS.

INDUSTRIAL APPLICABILITY

The transmission of the notification message of the ETWS may be implemented by the technical scheme provided in the present invention to satisfy the time delay requirement of 4 s. However, the existing paging message structure is modified less and there is no or very little increased overhead, thereby providing very strong industrial applicability.

What is claimed is:
1. A method for transmitting a primary notification message of an earthquake and tsunami warning system comprising:
after paging a terminal through a paging message containing indication information of an earthquake and tsunami warning system (ETWS) message, a base station scheduling the primary notification message of the ETWS as user data in sub-frames subsequent to a sub-frame with the paging message, wherein the sub-frames subsequent to the sub-frame with the paging message are appropriate sub-frames subsequent to the paging message in a specified time period, and generating control information containing an identifier (ID) of the ETWS, wherein the control information contains resource information on a downlink shared channel (DL-SCH) that is assigned for the primary notification message of the ETWS;

the base station sending the control information over a physical downlink control channel (PDCCH) and sending the primary notification message of the ETWS over the DL-SCH based on the control information; and after receiving the paging message containing the indication information of the ETWS message, the terminal immediately monitoring the PDCCH and detecting and analyzing the control information containing the identifier (ID) of the ETWS on the PDCCH to obtain the resource information contained in the control information, and receiving the primary notification message of the ETWS on corresponding resources of the DL-SCH based on the resource information, wherein the base station sends the control information over the PDCCH by putting the control information in a common search space within the PDCCH that is located within the sub-frame carrying the primary notification message of the ETWS or putting fixedly the control information in one or more control units within the PDCCH that is located within in the sub-frame carrying the primary notification message of the ETWS.

2. The method according to claim 1, wherein:
the ID of the ETWS, which is pre-appointed by the base station and the terminal, is used by user terminals of the ETWS to obtain the control information of the primary notification message of the ETWS on the PDCCH; or
the ID of the ETWS is an idle user identifier which is assigned temporarily for the user terminals of the ETWS before the base station sends the paging message, wherein the paging message further contains the ID of the ETWS; and the terminal reads the ID of the ETWS in the paging message after receiving the paging message.

3. The method according to claim 1, wherein the ID of the ETWS is a radio network temporary identifier (RNTI) or an identifier other than the RNTI which can be identified by both the base station and the terminal and is used to identify the control information of the primary notification message of the ETWS.

4. The method according to claim 1, further comprising:
the base station determining whether to be able to send the whole primary notification messages of the ETWS in the first sub-frame subsequent to the sub-frame with the paging message whenever sending out the paging message;
if yes, the base station scheduling the primary notification message of the ETWS in the first sub-frame, generating the control information containing the ID of the ETWS, sending the control information over the PDCCH of the first sub-frame and sending the primary notification message of the ETWS over the DL-SCH of the first sub-frame based on the control information;
otherwise, the base station segmenting the primary notification message of the ETWS into a plurality of segments, sending each obtained segment in a plurality of sub-frames, respectively, scheduling one segment of all the segments obtained by segmenting the primary notification message of the ETWS in each sub-frame of the plurality of sub-frames, generating control information corresponding to the segment, the control information containing the ID of the ETWS and containing resource information on the DL-SCH assigned for the segment, sending the control information corresponding to the segment over the PDCCH of the sub-frame, and sending the segment of the primary notification message of the ETWS over the DL-SCH of the sub-frame based on the control information.

5. The method according to claim 1, wherein:
when paging the terminal, the base station sends the paging message containing the indication information of the ETWS message in a plurality of sub-frames of one radio frame, schedules the primary notification message of the ETWS in one sub-frame of the radio frame, generates the control information, sends the control information over the PDCCH of the sub-frame, and sends the primary notification message of the ETWS over the DL-SCH of the sub-frame based on the control information.

6. The method according to claim 1, wherein:
when being scheduled, the primary notification message of the ETWS is scheduled as user data with the highest priority.

7. The method according to claim 1, wherein:
the indication information of the ETWS message is implemented by configuring a one bit flag, which is used for indicating that the primary notification message of the ETWS will be sent soon, in the paging message; or
the indication information of the ETWS message is a pre-appointed international mobile subscriber identification number (IMSI) used for indicating that the primary notification message of the ETWS will be sent.

8. A method for transmitting a notification message of an earthquake and tsunami warning system comprising:
after paging a terminal through a paging message containing indication information of an earthquake and tsunami warning system (ETWS) message, a base station scheduling the notification message of the ETWS as user data in sub-frames subsequent to a sub-frame with the paging message, wherein the sub-frames subsequent to the sub-frame with the paging message are appropriate sub-frames subsequent to the paging message in a specified time period, and generating control information containing an identifier (ID) of the ETWS, and the control information containing resource information on a downlink shared channel (DL-SCH) that is assigned for the notification message of the ETWS;

the base station sending the control information over a physical downlink control channel (PDCCH) and sending the notification message of the ETWS over the DL-SCH based on the control information; and after receiving the paging message containing the indication information of the ETWS message, the terminal immediately monitoring the PDCCH and detecting and analyzing the control information containing the ID of the ETWS on the PDCCH to obtain the resource information contained in the control information, and receiving the notification message of the ETWS on corresponding resources of the DL-SCH based on the resource information, wherein the base station sends the control information over the PDCCH by putting the control information in a common search space within the PDCCH that is located within the sub-frame carrying the notification message of the ETWS or putting fixedly the control information in one or more control units within the PDCCH that is located within the sub-frame carrying the notification message of the ETWS.

9. The method according to claim 8, wherein the notification message of the ETWS is a primary notification message of the ETWS or a secondary notification message of the ETWS.

10. The method according to claim 8, wherein:
the indication information of the ETWS message is implemented by configuring a one bit flag, which is used for indicating that the notification message of the ETWS will be sent soon, in the paging message; or the indication information of the ETWS message is a pre-appointed international mobile subscriber identification number (IMSI) used for indicating that the notification message of the ETWS will be sent.

11. A system for transmitting a primary notification message of an earthquake and tsunami warning system (ETWS) comprising a base station and a terminal, wherein:
the base station comprises a first transmitting unit, a scheduling unit and a second transmitting unit, wherein:
the first transmitting unit is configured to page the terminal through a paging message at a paging opportunity of the terminal and trigger the scheduling unit, the paging message containing ETWS message indication information;
the scheduling unit is configured to schedule the primary notification message of the ETWS as user data in sub-frames subsequent to a sub-frame with the paging message containing the indication information of the ETWS message after being triggered, wherein the sub-frames subsequent to the sub-frame with the paging message are appropriate sub-frames subsequent to the paging message in a specified time period, generate control information containing an ID of the ETWS and trigger the second transmitting unit, the control information containing resource information on a downlink shared channel (DL-SCH) that is assigned for the primary notification message of the ETWS;
the second transmitting unit is configured to send the control information over a physical downlink control channel (PDCCH) and send the primary notification message of the ETWS over the DL-SCH based on the control information after being triggered;
the terminal comprises a first receiving unit, a second receiving unit and a third receiving unit, wherein:
the first receiving unit is configured to trigger the second receiving unit after receiving the paging message containing the ETWS message indication information;
the second receiving unit is configured to immediately monitor the PDCCH and detect and analyze the control information containing the ID of the ETWS on the PDCCH after being triggered, to obtain the resource information contained in the control information and trigger the third receiving unit; and
the third receiving unit is configured to receive the primary notification message of the ETWS on corresponding resources of the DL-SCH based on the resource information after being triggered,
wherein the second transmitting unit sends the control information over the PDCCH by putting the control information in a common search space within the PDCCH that is located within the sub-frame carrying the primary notification message of the ETWS or putting fixedly the control information in one or more control units within the PDCCH that is located within the sub-frame carrying the primary notification message of the ETWS.

12. The system according to claim 11, wherein:
the base station and the terminal pre-appoint the ID of the ETWS, which is used by user terminals of the ETWS to obtain the control information of the primary notification message of the ETWS on the PDCCH; or
the first transmitting unit in the base station assigns temporarily an idle user identifier as the ID of the ETWS for users of the ETWS before sending the paging message containing the ID of the ETWS; and the first receiving unit of the terminal reads the ID of the ETWS thereof for use by the second receiving unit after receiving the paging message.

13. The system according to claim 11, wherein the ID of the ETWS is a radio network temporary identifier (RNTI) or an identifier other than the RNTI which can be identified by both the base station and the terminal and is used to identify the control information of the primary notification message of the ETWS.

14. The system according to claim 11, wherein:
the scheduling unit is further configured to determine whether to be able to send the whole primary notification message of the ETWS in the first sub-frame subsequent to the sub-frame with the paging message after being triggered:
if yes, the scheduling unit schedules the primary notification message of the ETWS in the first sub-frame, generates the control information containing the ID of the ETWS and triggers the second transmitting unit; the second transmitting unit sends the control information over the PDCCH of the first sub-frame and sends the primary notification message of the ETWS over the DL-SCH of the first sub-frame based on the control information;
otherwise, the scheduling unit segments the primary notification message of the ETWS into a plurality of segments, sends each obtained segment in a plurality of sub-frames, respectively, schedules one segment of all the segments obtained by segmenting the primary notification message of the ETWS in each sub-frame of the plurality of sub-frames, generates control information corresponding to the segment and triggers the second transmitting unit, the control information containing the ID of the ETWS and containing resource information on the DL-SCH assigned for the segment; and the second transmitting unit sends the control information corresponding to the segment over the PDCCH of the sub-frame and sends the segment of the primary notification message of the ETWS over the DL-SCH of the sub-frame based on the control information.

15. The system according to claim 11, wherein:
when paging the terminal, the first transmitting unit of the base station sends the paging message containing the indication information of the ETWS message in a plurality of sub-frames of one radio frame; accordingly, the scheduling unit schedules the primary notification message of the ETWS in one sub-frame of the radio frame and generates the control information; and the second transmitting unit sends the control information over the PDCCH of the sub-frame and sends the primary notification message of the ETWS over the DL-SCH of the sub-frame based on the control information.

16. The system according to claim 11, wherein:
the scheduling unit schedules the primary notification message of the ETWS as user data with the highest priority when scheduling the primary notification message of the ETWS.

17. The system according to claim 11, wherein:
the indication information of the ETWS message is implemented by configuring a one bit flag, which is used for indicating that the primary notification message of the ETWS will be sent soon, in the paging message; or
the indication information of the ETWS message is a pre-appointed international mobile subscriber identification number (IMSI) used for indicating that the primary notification message of the ETWS will be sent.

* * * * *